3,541,177
PROCESS FOR THE PREPARATION OF
BUTADIENE DIMER
Nobue Hagihara, Osaka, Shigetoshi Takahashi, Izumi-Ohtsu-shi, and Akira Kogure, Yokkaichi-shi, Japan, assignors to Japan Synthetic Rubber Co., Ltd., Tokyo, Japan
No Drawing. Filed Mar. 11, 1968, Ser. No. 711,889
Claims priority, application Japan, Mar. 15, 1967, 42/16,032
Int. Cl. C07c 11/00, 11/14
U.S. Cl. 260—677     9 Claims

ABSTRACT OF THE DISCLOSURE

A process for the preparation of butadiene dimer such as n-octatriene-1,3,7 by contacting butadiene with a transition metal catalyst, characterized in that the said catalyst is a palladium-tertiary phosphine complex which contains a dienophile as the ligand.

---

This invention relates to a novel process for the preparation of a butadiene dimer. More particularly, the invention relates to a novel process for the preparation of n-octatriene-1,3,7 and/or adducts thereof with alcohols, phenols, mercaptans, primary or secondary amines or aliphatic monocarboxylic acids, with very high selectivity, by dimerization of butadiene in the presence of a novel catalyst.

Prior arts for the preparation of n-octatriene-1,3,7 by dimerization of butadiene include the following:

(1) Process in which the dimerization is performed in the presence of a non-aromatic hydroxyl compound, employing a catalyst system consisting of a zero-valent nickel compound and a trivalent phosphorus arsenic or antimony compound as an electron donor. (Japanese patent publication No. 12,607/65);

(2) Process in which nickel carbonyl derivatives are used as the catalyst and phenolic compounds are used as the promotor. (Japanese patent publication No. 5,371/66); and (3) Process in which an alcohol is used as the solvent and a catalyst system composed of $NiCl_2 \cdot 2PPh_3$ (Ph being phenyl group) and $NaBH_4$ is employed. (Japanese patent publication No. 8055/66).

In any of the above known processes, the selectivity for the object product, n-octatriene-1,3,7, is low, and such by-products as n-octatriene-1,3,6, vinylcyclohexene and other oligomers tend to mix in the reaction product. Therefore cumbersome purification procedures must be performed before obtaining n-octatriene-1,3,7 of high purity.

The object of the present invention is to provide a process for the preparation of n-octatriene-1,3,7 by dimerization of butadiene with substantially 100% selectivity.

Another object of the invention is to provide a process for the preparation of an adduct of n-octatriene-1,3,7 with a specific functional organic compound or a mixture of the adduct and n-octatriene with substantially 100% selectivity, by dimerization of butadiene in the presence of a specific catalyst and the said specific organic compound.

A further object of the invention is to provide a group of novel catalysts which exhibit excellent selective activity in the preparation of n-octatriene-1,3,7 by dimerization of butadiene.

The foregoing objects are accomplished in accordance with the present invention in which a butadiene dimer is formed by contacting butadiene with a transition metal catalyst, characterized in that the said catalyst is a palladium-tertiary phosphine complex which contains a dienophile as the ligand.

The "dienophile" can be defined to be an unsaturated compound having a double or triple bond, which can form an adduct with a conjugated diene in Diels-Alder reaction. Examples of such dienophiles include: maleic anhydride, fumaric acid, esters of maleic acid and fumaric acid, citraconic anhydrid, fumaronitrile, benzoquinone, naphthoquinone, acetylene dicarboxylate, etc. Particularly preferred dienophiles for the catalyst employed in this invention are maleic anhydride and benzoquinone.

The preferred tertiary phosphine to be present in the catalyst of the invention as the ligand are those represented by the formulae $$R_3P, \text{ or } R_2P-R'-PR_2$$

in which each R is selected from alkyl radicals of 1–6 carbons, cycloalkyl radicals of 4–6 carbons, and aryl radicals of 6–12 carbons which may be substituted with a halogen, and R' is selected form alkylene radicals of 1–4 carbons.

Specific examples of tertiary phosphines covered by the formula R3P are as follows: triethylphosphine, tributylphosphine, triphenyl phosphine, tri - p - chlorophenylphosphine, diphenylmethylphosphine, tri - o-tolylphosphine, tri - p - biphenylphosphine, tri - o - biphenylphosphine, tricyclohexylphosphine, etc. Those tertiary phosphines are present as unidentate ligand in the catalyst compound employed in this invention.

Also examples of tertiary phosphines of the formula $R_2P-R'-PR_2$ are as follows: $Ph_2PCH_2CH_2PPh_2$ in which Ph stands for a phenyl radical, $$(CH_3)_2PCH_2CH_2P(CH_3)_2$$

$$(C_2H_5)_2PCH_2CH_2P(C_2H_5)_2, Ph_2PCH_2PPh_2$$

and $Ph_2PCH_2CH_2CH_2PPh_2$. These tertiary phosphines are present in the catalyst compound of this invention as bidentate ligand.

A preferred group of the catalyst compounds in accordance with the invention can be represented by the general formula:

$$(R_3P)_2Pd \cdot L$$

in which R is selected from the above-defined alkyl, cycloalkyl and aryl radicals and is most preferably phenyl radical, and L is the dienophile as above-defined.

The particularly preferred group of the catalysts in accordance with the invention are palladium-phosphine complexes containing maleic anhydride as the ligand, which are represented by the formula

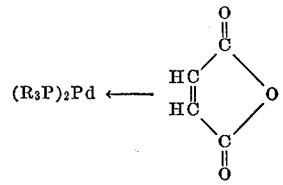

In the above formula R is selected from the above-defined alkyl, cycloalkyl and aryl radicals and is most preferably phenyl radical.

The catalyst composed of such palladium-phosphine complex containing a dienophile as the ligand can be prepared, for example, in the following manner. Tetrakis-tertiary phosphine palladium of the formula $Pd(R_3P)_4$ is dissolved in an organic solvent such as benzene, toluene and tetrahydrofuran and the solution is mixed with an organic solvent solution of dienophile in an inert gaseous atmosphere such as of nitrogen, at temperatures ranging from room temperature to the boiling point of the solution to be formed. Then the solvent is removed by evaporation, and if necessary, the residue obtained is recrystallized from an organic solvent. Thus the complex which is useful for the present invention is obtained.

Further, the catalysts of the invention which contain as the ligand a di-tertiary phosphine such as bis(diphenylphosphine)ethane, are easily obtainable by reacting said di-tertiary phosphine with the complex $(R_3P_2)Pd.L$ prepared in accordance with the foregoing manner to exchange the phosphine ligand.

The complex is sensitive to air, that is, it tends to lose its activity in the air, but is relatively stable against water.

According to the present invention, butadiene is dimerized as it is contacted with the specified catalyst. The catalyst is caused to be present in the reaction system, preferably in a quantity of 0.001–10 millimols per mol of butadiene, particularly, 0.01–5 millimols. The optimum quantity of the catalyst is 0.1–3 millimols per mol of butadiene.

The reaction temperature normally ranges from room temperature to 150° C., preferably 40° C.–120° C. No particular restriction is attached to the reaction pressure, so far as it is sufficient to maintain the reaction mixture in a liquid phase. Generally, the pressure ranging from the normal atmospheric pressure to 30 kg./cm.$^2$ is preferred. Normally higher pressure is preferred because such quickens the rate of reaction.

Since the catalyst of the invention is air-sensitive as aforesaid, it is preferred to perform the reaction in the atmosphere of a gas which is inert to the catalyst, such as nitrogen or argon, or in an autogeneous atmosphere of butadiene.

The use of a solvent is optional, but normally its presence is preferred. The quantity of a solvent is neither critical, but normally it is up to ten times by volume of butadiene, preferably of approximately equal volume. As the solvent, aromatic hydrocarbons such as benzene, toluene, xylene; saturated aliphatic hydrocarbons such as pentane, hexane, heptane, octane; cycloaliphatic hydrocarbons such as cyclohexane; decaline; ethers such as ethyl ether, tetrahydrofurane; ketones such as acetone, methyl ethyl ketone; alcohols such as ethanol, methanol, isopropanol, tert.-butanol, cyclohexanol; amines like aliphatic amines such as diisopropylamine and butylamine, aromatic amines such as aniline and toluidine, heterocyclic amines such as piperidine and morpholine; various phenols; mercaptans such as propyl mercaptan, butyl mercaptan, hexyl mercaptan and thiophenol; and aliphatic monocarboxylic acids such as formic, acetic, and propionic acids, etc., can be used.

When no solvent is used, or a liquid organic solvent which is inert under the reaction conditions, such as a hydrocarbon, an ether, a ketone and an alcohol which exhibits steric hindrance such as isopropanol or tert.-butanol, is employed as the solvent, n-octatriene-1,3,7 is formed as the butadiene dimer with substantially 100% selectivity. It was discovered that when these solvents are used, the reaction rate increases by the order stated, i.e., hydrocarbons, ethers, ketones and alcohols which exhibit steric hindrance.

On the other hand, when a functional organic compound is used as the solvent, a product in which the compound is added to the double bond of n-octatriene-1,3,7, or a mixture of such addition product with n-octatriene-1,3,7, is obtained as the butadiene dimer with substantially 100% selectivity. Such functional organic compounds include: alcohols which exhibit no steric hindrance, for example, monohydric alcohols of 1–6 carbons such as methanol, ethanol and cyclohexanol; phenols exhibiting no steric hindrance, for example, monovalent phenols such as phenol, methyl phenol and dimethyl phenol; mercaptans exhibiting no steric hindrance, for example, monovalent mercaptans of 1–6 carbons, such as methylmercaptan, ethylmercaptan and thiophenol; primary or secondary amines; and aliphatic monocarboxylic acids of 1–5 carbons, such as acetic acid, formic acid and propionic acid.

Among those addition products the main product can be represented by the formula below:

in which R″ is a member selected from the group consisting of alkoxy radicals of 1–6 carbons, aryloxy radicals of 6–8 carbons, alkylthio radicals of 1–6 carbons, various residues of primary amines and secondary amines, and aliphatic acid radicals of 1–5 carbons.

For example, if methanol or acetic acid is used as the solvent, respectively the following adduct is obtained as the main product.

In the case of methanol an adduct in which the $C_3O$—radical is added to the inner carbon of the molecule is obtained in an amount not exceeding 5%. In the case of acetic acid an adduct in which the $CH_3COO$— radical is added to the inner carbon of the molecule is obtained in amount of about 30%. The ratio of these adducts to n-octatriene-1,3,7 normally increases with the increase in the quantity of solvent, if the quantity of butadiene is unchanged. With certain types of solvents, however, the product is almost exclusively the adduct or adducts. Furthermore, the adducts can be easily separated from n-octatriene-1,3,7 by the conventional distillation.

Thus, according to the present invention, by the use of the above-specified novel catalyst, n-octatriene-1,3,7 and/or the adduct of n-octatriene-1,3,7 with a functional organic compound as above-described, can be obtained with substantially 100% selectivity. This is a quite surprising result compared with the known dimerization methods of butadiene, in which many by-products other than n-octadiene-1,3,7, such as n-octatriene-1,3,6, 1-vinyl-3-methylene-cyclopentane, vinylcyclohexene-3, 1,5 - cyclooctadiene and higher molecular weight butadiene oligomers or polymers are formed. In fact, the catalyst of the invention exhibits no appreciable activity for the formation of octatriene isomers other than n-octatriene-1,3,7, cyclooctadienes and other butadiene oligomers or polymers.

Thus according to the invention, n-octatriene-1,3,7 or an adduct thereof can be recovered in pure form, simply by distilling off the volatile butadiene from the reaction mixture. If a solvent is used in the reaction, it is likewise removed by distillation.

N-octatriene-1,3,7 and adducts thereof prepared in accordance with the process of the present invention are useful not only as polymerizable or copolymerizable monomers but also as starting materials for the synthesis of higher alcohols, amines, ethers, esters and the like.

The invention now will be explained more specifically with reference to the examples, it being however understood that the invention is in no way limited thereby so far as the gist of this invention is not derivated.

EXAMPLE 1

(A) Preparation of catalyst

To 30 ml. of a benzene solution containing 1,155 mg. (1 millimol) of tetrakis(triphenylphosphine)palladium [Pd(Ph$_3$P)$_4$], 15 ml. of tetrahydrofuran solution of equimolar maleic anhydride was added dropwise with stirring at room temperature in a nitrogen gas atmosphere. The reaction liquid turned light yellow in color. After completion of the dropping, agitation was continued for 30 minutes, and thereafter the solvents were removed at room temperature under reduced pressure. The yellow residue was dissolved in 15 ml. of benzene-methanol (2:1) mixed solvent. When 15 ml. of n-hexane is added to the solution and cooled, yellow crystal was precipitated. The crystal was recovered by filtration, washed with benzene-methanol-hexane mixed solvent, and dried in vacuum. Thus 630 mg. of the object product of the formula:

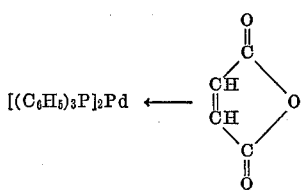

was obtained.

The values of properties of the so prepared catalyst were as follows:

The decomposing point: 180–213° C. (measured in nitrogen gas atmosphere).

The elementary analysis values, measured (percent): C, 66.39; H, 4.49; O, 6.30; P, 8.72. Calculated (percent): C, 65.90; H, 4.43; O, 6.58; P, 8.50.

The molecular weight, measured 732; calculated 729.0.

(B) synthesis of n-octatriene-1,3,7

A stainless steel autoclave of 100 ml. capacity was charged with 219 mg. (0.3 millimol) of the above product of A, bis(triphenylphosphine)palladium-maleic anhydride complex, and 20 ml. of refined benzene in a nitrogen gas atmosphere. After the autoclave was closed, the nitrogen gas inside the autoclave was substituted with butadiene gas by flushing it several times. Then 25 ml. of dry butadiene which had been cooled in a Dry Ice-methanol bath was introduced into the autoclave. Then the autoclave was heated to 110° C. under shaking, and the reaction was continued for 7 hours at that temperature. In the meantime, the pressure dropped from approximately 10 kg./cm.$^2$ to approximately 4 kg./cm.$^2$. The heating was stopped and the reaction mixture was cooled to room temperature. The yellow, liquid reaction mixture was then transferred into a Claisen flask of 50 cc. capacity in a nitrogen gas atmosphere, and subjected to distillation on an oil bath of approximately 55° C. under a reduced pressure of approximately 20 mm. Hg. This separation procedure of the reaction product from the catalyst was also performed in a nitrogen gas atmosphere. The mixture of benzene and the reaction product thus recovered was taken into a vessel which had been cooled in a Dry Ice-methanol bath. Distilling the benzene off the liquid mixture, 5 g. of the reaction product was obtained. The product consisted almost exclusively of n-octatriene-1,3,7 having a boiling point of 124°–125° C. and a $n_D{}^{20}$ of 1.4682, and contained no appreciable quantities of other oligomers.

EXAMPLE 2

Repeating the same procedure as of B of Example 1 except that 20 ml. of butadiene was used and the reaction was continued for 3 hours at 120° C., 5.6 g. of n-octatriene-1,3,7 was obtained. The quantitative analysis of the product by gas chromatography revealed only trace amounts of 4-vinylcyclohexene and butadiene trimer were produced.

EXAMPLE 3

Repeating the procedures described in B of Example 1 except that 20 ml. of refined tetrahydrofuran was used as the solvent, and 20 ml. of butadiene was subjected to the reaction for 7 hours at 115° C., 10.7 g. of n-octatriene-1,3,7 was obtained with approximately 100% selectivity.

EXAMPLE 4

Repeating the procedures described in B of Example 1 except that 20 ml. of acetone was used as the solvent and that 20 ml. of butadiene was subjected to the reaction for 7 hours at 115°–119° C., 11.2 g. of n-octatriene-1,3,7 was obtained with approximately 100% selectivity.

EXAMPLE 5

Repeating the procedures described in B of Example 1 except that 20 ml. of isopropanol was used as the solvent and that 20 ml. of butadiene was subjected to the reaction for 4 hours at 100°–110° C., 9.3 g. of n-octatriene-1,3,7 was obtained with approximately 100% selectivity.

EXAMPLE 6

The procedures described in B of Example 1 were repeated except that 20 ml. of methanol was used as the solvent and that 20 ml. of butadiene was reacted for 30 minutes at 100° C. Furthermore, the separation of the reaction product and the catalyst from the reaction mixture was performed by distillation on an oil bath of approximately 70° C. at a reduced pressure of approximately 8 mm. Hg.

Thus obtained 10 g. of the reaction product consisted exclusively of an addition product of methanol to n-octatriene-1,3,7

$$(CH_3—CH_2CH=CHCH_2CH_2CH=CH_2)$$

The product had a boiling point of 96°–99° C./80 mm. Hg, and a $n_D{}^{20}$ of 1.4409.

EXAMPLE 7

Example 6 was repeated except that the amount of the catalyst was reduced to 73 mg. (0.1 millimol) and that the reaction was performed for 50 minutes at 70° C. Thus 16 g. of the methanol adduct of n-octatriene-1,3,7 described in Example 6 was obtained.

EXAMPLE 8

Repeating Example 7 except that the reaction was performed for 2 hours at 40° C., 10.4 g. of the similar adduct was obtained.

EXAMPLE 9

(A) Preparation of catalyst

To 30 ml. of a benzene solution containing 1,155 mg. of tetrakis(triphenylphosphine)palladium [Pd(Ph$_3$P)$_4$], 15 ml. of a benzene solution containing 108 mg. of p-benzoquinone was dropped with stirring at room temperature. After the completion of the dropping, agitation was continued for 30 minutes. Thereafter, the solvent was removed at room temperature under reduced pressure. The red residue was recrystallized from a benzene-n-hexane mixed solution. As a result, 600 mg. of the complex was obtained, which had the decomposing point of 217–218° C. (measured in a nitrogen gas atmosphere), and whose elementary analysis values were as follows:

Measured (percent): C, 68.51; H, 4.88; O, 4.18; P, 8.64. Calculated (percent): C, 68.25; H, 4.64; O, 4.33; P, 8.38. Molecular weight 769, 739.0.

(B) Synthesis of methanol adduct of n-octatriene-1,3,7

Following the procedures of Example 6 except that 74 mg. (0.1 millimol) of above bis(triphenylphosphine) palladium-benzoquinone complex,

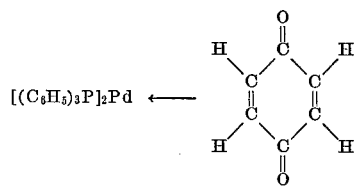

was used as the catalyst and that the reaction was performed for 100 minutes at 80° C., 14.5 g. of a methanol adduct of n-octatriene-1,3,7 was obtained.

EXAMPLE 10

Example 6 was repeated except that the methanol solvent was replaced by ethanol, and that the reaction was performed for one hour at 110–115° C. Thus, 6.4 g. of n-octatriene-1,3,7 and 6.5 g. of an ethanol adduct of n-octatriene-1,3,7 were obtained. The adduct had a boiling point of 105°–107° C./73 mm. Hg and a $n_D^{20}$ of 1.4422.

EXAMPLE 11

Example 6 was repeated except that 20 ml. of glacial acetic acid was used as the solvent and that the reaction was continued for 6 hours at 120° C. Thus 7 g. of acetic acid adduct of n-octatriene-1,3,7 having a boiling point of 72°–75° C./6 mm. Hg was obtained.

EXAMPLE 12

Example 1 was repeated except that bis(triphenylphosphine)palladium-fumaric acid complex having the formula

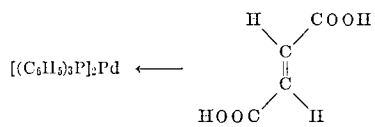

was used instead of bis(triphenylphosphine)palladium-maleic anhydride complex. The complex used in this example had the following values of properties:

The decomposing point: 233–241° C.

The elementary analysis values, measured (percent): C, 64.36; H, 4.67; P, 8.29. Calculated (percent): C, 64.31; H, 4.59; P, 8.14.

As a result, n-octatriene-1,3,7 was obtained with a yield of 85% and a selectivity of substantially 100%.

EXAMPLE 13

Example 1 was repeated except that bis(triphenylphosphine)palladium-citraconic anhydride complex having the formula

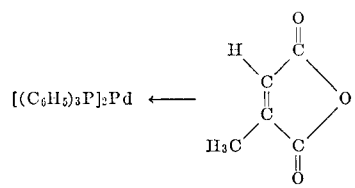

was used instead of bis(triphenylphosphine)palladium-anhydride complex. The complex used in this example exhibited the following values of properties:

The decomposing point: 170–183° C.

The elementary analysis values, measured (percent): C, 66.50; H, 4.78; P, 8.11. Calculated (percent): C, 66.27; H, 4.61; P, 8.34.

As a result, n-octatriene-1,3,7 was obtained with a yield of 60% and a selectivity of substantially 100%.

EXAMPLE 14

Example 6 was repeated except that bis(triphenylphosphine)palladium-dimethylfumarate complex having the following formula

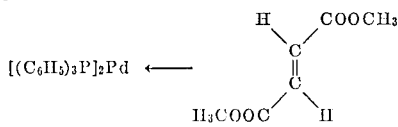

was used as the catalyst. The complex used in this example exhibited the following values of properties.

The decomposing point: 174–176° C.

The elementary analysis values, measured (percent): C, 64.87; H, 4.96; O, 8.46. Calculated (percent): C, 65.08; H, 4.94; O, 8.26. Molecular weight 720, 775.1.

As a result, a methanol adduct of n-octatriene-1,3,7 was obtained with a yield of 86% and a selectivity of substantially 100%.

EXAMPLE 15

Example 6 was repeated except that bis(triphenylphosphine)palladium-fumaronitrile complex having the following formula:

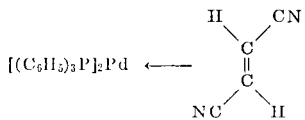

was used as the catalyst. The complex used in this example exhibited the following values of properties:

The decomposing point: 208–210° C.

The elementary analysis values, measured (percent): C, 70.45; H, 4.78; N, 3.51; P, 7.61. Calculated (percent): C, 70.19; H, 4.87; N, 3.56; P, 7.87.

As a result, a methanol adduct of n-octatriene-1,3,7 was obtained with a yield of 85% and a selectivity of substantially 100%.

EXAMPLE 16

Example 6 was repeated except that bis(triphenylphosphine) palladium-naphthoquinone complex having the formula

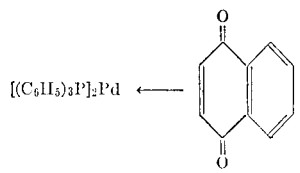

was used as the catalyst. The complex used in this example exhibited the following values of properties:

The decomposing point: 220–224° C.

The elementary analysis values, measured (percent): C, 70.27; H, 4.74; O, 4.25; P, 7.60. Calculated (percent): C, 70.01; H, 4.60; O, 4.06; P, 7.85.

As a result, a methanol adduct of n-octatriene-1,3,7 was obtained with a yield of 88% and a selectivity of substantially 100%.

EXAMPLE 17

Example 1 was repeated except that the amount used of the solvent was 0.2 millimol, the amount used of butadiene was 20 ml., a mixture consisting of 20 ml. of acetone and 15 g. of aniline was used as the solvent and that the reaction was carried out for 30 minutes. As a result, there were obtained 19.2 g. of aniline adducts of n-octatriene-1,3,7 which consist of 14.4 g. of phenylocta-2,7-dienyl amine (B.P. 184–186° C./25 mm. Hg) and 4.8 g. of phenyl di(octa-2,7-dienyl amine) (B.P. 209–210° C./5 mm. Hg).

We claim:

1. A process for the preparation of n-1,3,7-octatriene by contacting butadiene with a transitional metal catalyst, characterized in that the said catalyst is a palladium-tertiary phosphine complex which contains a dienophile selected from the group consisting of maleic anhydride, benzoquinone, fumaric acid, fumaric acid esters, citraconic anhydride, fumaronitrile and naphthoquinone as the ligand.

2. The process of claim 1 in which the said catalyst is a complex represented by the formula, $$(R_3P)_2Pd \cdot L$$

in which each R is a member selected from the group consisting of alkyl radicals of 1–6 carbons, cycloalkyl radicals of 4–6 carbons and aryl radicals of 6–12 carbons, and L is a dienophile selected from the group consisting of maleic anhydride, benzoquinone, fumaric acid, fumaric acid esters, citraconic anhydride, fumaronitrile and naphthoquinone.

3. The process of claim 2 in which R of the formula is phenyl radical.

4. The process of claim 1 in which the catalyst is employed in the quantity of 0.001 to 10 millimols per mol of butadiene.

5. The process of claim 1 in which butadiene is contacted with the catalyst at temperatures ranging from room temperature to 150° C.

6. The process of claim 1 in which butadiene is contacted with a palladium-tertiary phosphine complex containing a dienophile selected from the group consisting of maleic anhydride, benzoquinone, fumaric acid, fumaric acid esters, citraconic anhydride, fumaronitrile and naphthoquinone as the ligand, at a pressure sufficient to maintain the reaction mixture in a liquid phase in the absence of solvent, and thus formed n-octatriene-1,3,7 is recovered.

7. The process of claim 1 in which butadiene is contacted with a palladium-tertiary phosphine complex containing a dienophile selected from the group consisting of maleic anhydride, benzoquinone, fumaric acid, fumaric acid esters, citraconic anhydride, fumaronitrile and naphthoquinone as the ligand, in the presence of a liquid organic medium which is inert under the reaction conditions, and thus formed n-octatriene-1,3,7 is recovered.

8. The process of claim 1 in which butadiene is contacted with a palladium-tertiary phosphine complex containing a dienophile selected from the group consisting of maleic anhydride, benzoquinone, fumaric acid, fumaric acid esters, citraconic anhydride, fumaronitrile and naphthoquinone as the ligand in the presence of a compound selected from alcohols, phenols, mercaptans, primary amines, secondary amines and aliphatic monocarboxylic acids which exhibit no steric hindrance, and thereafter the so formed butadiene dimer in the form of an adduct of n-octatriene-1,3,7 with the same compound or of a mixture of such an adduct with n-octatriene-1,3,7 is recovered.

9. A process for the preparation of n-1,3,7 octatriene by contacting butadiene with a catalyst which is a palladium metal-tertiary phosphine complex selected from the group consisting of bis(triphenylphosphine)palladium-maleic anhydride complex, bis(triphenylphosphine)palladium-fumaric acid complex and bis(triphenylphosphine)palladium-citraconic anhydride complex, in the presence of a liquid organic medium which is inert under the reaction conditions, and thus formed n-1,3,7-octatriene is recovered.

References Cited

UNITED STATES PATENTS

| 2,631,173 | 3/1963 | Hillger et al. | 260—666 |
| 3,346,608 | 10/1967 | Kutepolo et al. | 260—439 |
| 3,277,099 | 10/1966 | Seibt et al. | 260—666 |
| 3,444,258 | 5/1969 | Kohnle et al. | 260—677 |
| 3,346,608 | 10/1967 | Von Kutepow et al. | 260—439 |

DELBERT E. GANTZ, Primary Examiner

J. M. NELSON, Assistant Examiner

U.S. Cl. X.R.

260—680